United States Patent

[11] 3,557,771

| [72] | Inventor | Walter Koziol<br>Russell, Ill. |
|---|---|---|
| [21] | Appl. No. | 765,848 |
| [22] | Filed | Oct. 8, 1968 |
| [45] | Patented | Jan. 26, 1971 |
| [73] | Assignee | Charmglow Manufacturing Company<br>Antioch, Ill.<br>a corporation of Illinois |

[54] BARBECUE GRILL WITH TILTING GRID
7 Claims, 3 Drawing Figs.

| [52] | U.S. Cl. | 126/25 |
|---|---|---|
| [51] | Int. Cl. | A47j 37/00,<br>F24b 3/00 |
| [50] | Field of Search | 126/25,<br>25A, 9, 41 |

[56] References Cited
UNITED STATES PATENTS

| 3,121,386 | 2/1964 | Persinger et al. | 126/25AX |
|---|---|---|---|
| 3,244,163 | 4/1966 | McGlaughlin | 126/25 |
| 3,285,239 | 11/1966 | Drake | 126/25A |
| 3,386,432 | 6/1968 | Hanson | 126/41 |
| 3,396,716 | 8/1968 | Weyland et al. | 126/25X |

Primary Examiner—Charles J. Myhre
Attorney—Neil E. Hamilton

ABSTRACT: Steps are integrally mounted in one of two opposing wall panels of a base portion of a barbecue grill to permit horizontal or a tilting positioning of one or more grid members. In a preferred embodiment the wall panels diverge outwardly from the base portion and are positioned at different heights from the bottom of the base.

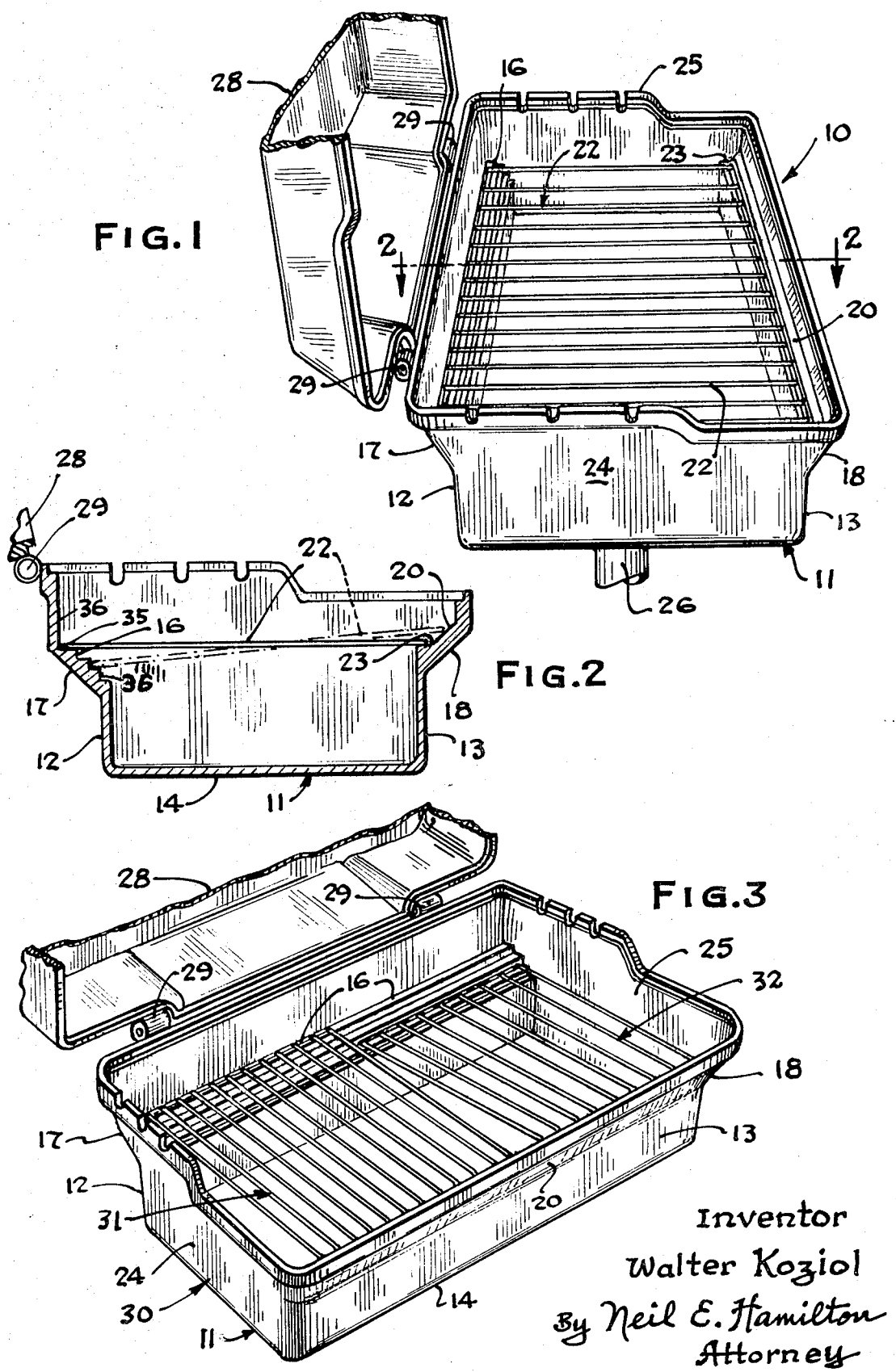

BARBECUE GRILL WITH TILTING GRID

BACKGROUND OF THE INVENTION

This invention relates to a tilting type grid for a barbecue grill unit and more particularly, to a barbecue unit wherein step means are mounted in opposing wall panels in the base portion of the in unit to support a grid member at different levels.

Adjustably supportable grids in barbecue units of the type concerned with in this invention are described in U.S. Pat. No. 3,125,999 and 3,244,163. Both of these patents illustrate adjustment openings in a barbecue unit housing for engagement with a grid which is inserted in the openings at various heights to effect a tilting or a horizontal positioning of the grid. The prior art nowhere shows a barbecue unit with opposing wall panels wherein one of the panels has steps for a horizontal or a tilting positioning of a grid member. Neither does the prior art illustrate a barbecue unit with opposing wall panels with steps integrally mounted therein and the panels diverging outwardly from the base portion.

It is an object of the present invention to provide a novel housing for a barbecue grid which eliminates openings through the walls of a barbecue unit. It is another object of this invention to provide a tilting type grid in a barbecue which is easily manipulated and wherein the grid is unitary and not extendable. It is still another object of the present invention to provide a tilting grid in a barbecue housing which is manufactured without extensive tooling or molding. It is yet another object of this invention to provide a retaining means in a housing for two or more grid members which can be tilted at various positions or retained horizontally.

SUMMARY OF THE INVENTION

The foregoing objects are accomplished and the shortcomings of the prior art are overcome by the present barbecue grill unit which comprises two opposing wall panels in the base portion of the unit, at least one of which has disposed thereon step means to provide support for one or more grid members. One of the steps or ledges provides a horizontal positioning of a grid and the others, a tilting of a grid. When the grid is moved to or from a horizontal or tilting position, the end of the grid opposite that contacting the steps moves correspondingly upwardly or downwardly on an opposing slanted wall.

BRIEF DESCRIPTION OF DRAWING

A better understanding of the present tilting grid will be accomplished by reference to the drawing wherein:

FIG. 1 is a perspective view of the tilting grid in a barbecue grill.

FIG. 2 is a view in vertical section taken along line 2-2 of FIG. 1.

FIG. 3 is a view similar to FIG. 1 but showing the grid in two sections.

DESCRIPTION OF THE PREFERRED EMBODIMENT

Proceeding to a detailed description of the present invention, the barbecue grill generally 10 is comprised of a base portion 11 with opposing wall panels 12 and 13 and a bottom 14. Open steps 16 are mounted on wall panel 12 on the upwardly diverging wall portion 17 thereof and extend substantially across it. A second opposite and similarly upwardly diverging wall portion 18 has an inclined, smooth surface 20 for contact with grid 22 which is constructed to contact one of steps 16 and a part of wall portion 18 at all times. Diverging wall portion 17 is disposed at a lower elevation from bottom 14 than wall portion 18. Thus grid 22 rests in a horizontal position when it contacts the highest step 16 and on lower ledge 23 of inclined surface 20. In all other respects, grill 10 is similar to the normal barbecue grill, the base being completed by end wall 24 and 25 and the base supported by a hollow pole 26 through which can pass the usual utilities (not shown) such as gas or electric to preferably heat the usual ceramic briquets on a grate (all of which are standard and not shown). A cover 28 completes the grill 10 being hinged to base 11 by hinges 29.

DESCRIPTION OF THE ALTERNATIVE EMBODIMENT

In the alternative embodiment generally 30 illustrated in FIG. 3, the same reference numerals are employed to indicate the same parts as described in FIGS. 1 and 2. The difference between the two embodiments is a double grid 31 and 32 which in effect is grid 22 in two parts. Grids 31 and 32 are constructed to contact and be supported by steps 16 at one end and a portion of wall 20 or ledge 23 when positioned on any step 16.

OPERATION

A better understanding of the advantages of the barbecue grill 10 and grid 22 will be had by a description of its operation. Grid 22 is readily positioned and freely supported on any of steps 16 depending on whether a horizontal placement or a pitched position is desired. It will be noted that when grid 22 is in a horizontal position, one end rests on the highest step 16 and on ledge 23. To tilt grid 22, one end of grid 22 is moved down steps 16 which causes the opposite end to ride up wall 20. When in a tilting position, force of gravity will cause end 35 of grid 22 to engage the vertical wall sections 36 of steps 16 by a tendency of the grid 22 to back down wall 20 to effect positive positioning and prevent undesired shifting between the front and backwalls 13 and 12, respectively.

Grids 31 and 32 operate to give the same desired positive placement in unit 30 as described for grid 22 in barbecue 10. An additional advantage is the independent positioning of grids 31 and 32 to give pitched or horizontal placement depending upon the type of meat being grilled and whether it is desired to have the grease flow toward the backwall 12.

Steps 16 are illustrated as being integrally molded into and part of aluminum molded base 11. If desired, the steps could be made separately and secured by other means such as nuts and bolts, screws or the like. While four steps are shown for step means 16, any number of same can be employed. Alternatively, small lips, ridges or steps can be molded or secured to wall 20 to give added stability and ledge 23 can be eliminated with wall 20 joining the interior surface of wall panel 13 at an oblique angle which will still offer support to grid 22 when it rests horizontally on highest step 16.

As indicated previously, the preferred metal for forming base and top members 12 and 28, respectively, is aluminum. However, cast iron or alloys of iron and/or aluminum can be used. Grids 22, 31 and 32 are formed of stainless steel or chrome-plated wire but other metals such as cast aluminum can be employed.

It will thus be seen that through the present invention there is now provided a barbecue grill assembly wherein a grid can be quickly and easily positioned without having to fit a grid into holes. No specially formed grid need by be fabricated, such as an extendable grid to reach different levels of a retaining ledge in a base portion. The base portion of the barbecue grill unit is easily molded and economically manufactured. The grid and base of the grill are fabricated in a manner to be maintenance-free and of great durability.

The foregoing invention can now be practiced by those skilled in the art. Such skilled persons will know that the invention is not necessarily restricted to the particular embodiments presented herein. The scope of the invention is to be defined by the terms of the following claims as given meaning by the preceding description.

I claim:

1. A barbecue grill comprising a base portion, opposing wall panels forming said base portion, open step means integrally molded into and forming a part of one of said wall panels, a grid member adapted to be supported at opposing ends by said step means and said opposing wall, said step means constructed and arranged to support said grid member in at least two different positions, said grid member being freely supported by said step means and said opposing wall and said wall panel with said integrally molded open step means and said opposing wall diverging upwardly and outwardly from said base portion and at different heights from the bottom of the said base portion.

2. The barbecue grill as defined in claim 1 wherein said wall panel opposite said step means includes an inclined, substantially smooth surface for contact with said grid member.

3. The barbecue grill as defined in claim 1 wherein said grid is constructed in one unit.

4. The barbecue grill as defined in claim 1 wherein said grid comprises at least two independent members.

5. The barbecue grill as defined in claim 1 wherein said grid is comprised of wire.

6. The barbecue grill as defined in claim 1 wherein said step means extends substantially the entire distance across said wall panel.

7. The barbecue grill as defined in claim 2 wherein said opposing wall panel includes a ledge at the base of said smooth surface to provide horizontal positioning of said grid.